F. H. ISAACS.
SULKY-PLOW.

No. 172,025. Patented Jan. 11, 1876.

Witness
Horace Harris
J. C. Tunbridge

Inventor.
Fred. H. Isaacs.

UNITED STATES PATENT OFFICE.

FREDERIC H. ISAACS, OF NEWARK, NEW JERSEY.

IMPROVEMENT IN SULKY-PLOWS.

Specification forming part of Letters Patent No. 172,025, dated January 11, 1876; application filed October 14, 1875.

*To all whom it may concern:*

Be it known that I, FREDERIC H. ISAACS, of Newark, in the county of Essex and State of New Jersey, have invented a certain Improvement in Sulky Gang-Plows, of which the following is a specification:

My invention consists in improvements in the mode of operating the plows—using one lever for all—and in the mode of hanging, supporting, and graduating the plows, and of attaching a counter-balance.

Figure 1:
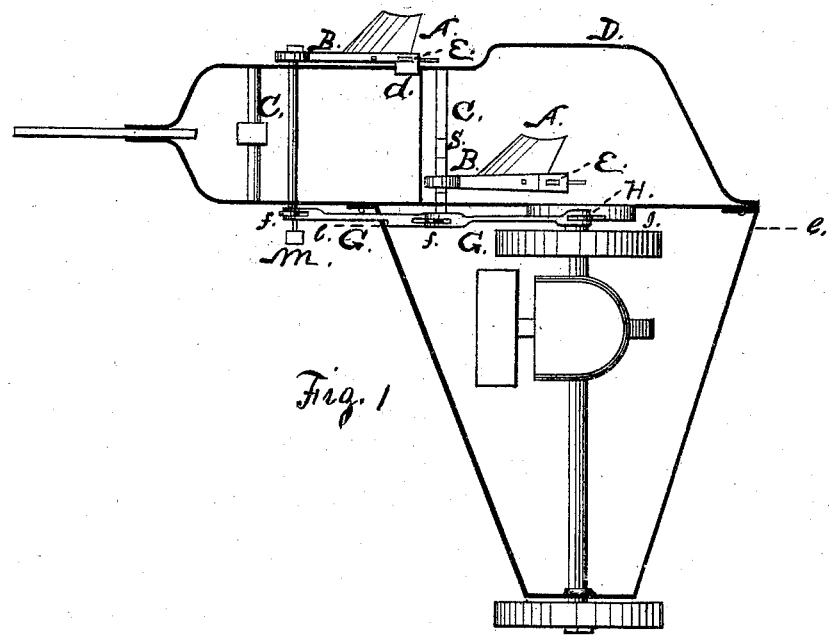
Figure 2:
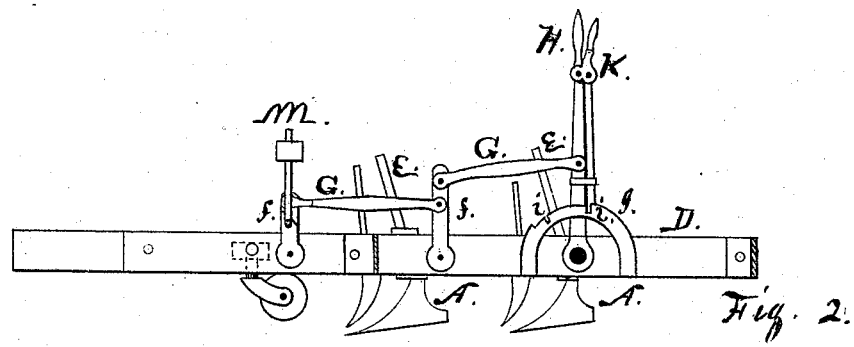
Figure 3:
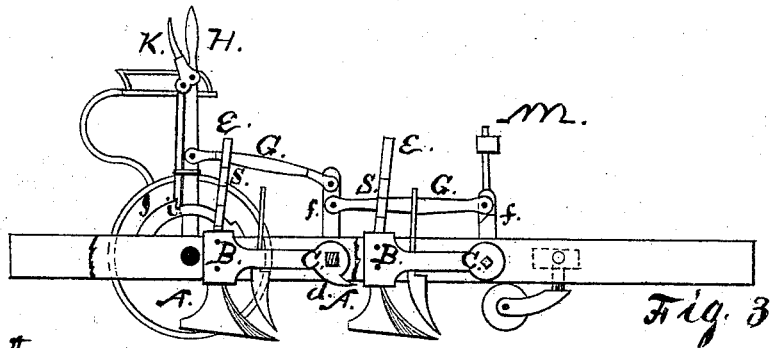

Figure 1 is a plan view. Fig. 2 is a sectional elevation to the right of the line *e e.* Fig. 3 is an elevation from the side of the frame opposite to Fig. 2.

The plows A, by the lifters B, are hung on revolving shafts C, which pass through the frame D, and the plows are supported by the frame in the use of flange-stops *d,* the one for the forward plow resting on the top of the frame, and the one for the rear plow catching up against the frame from below. The forward plow is hung outside of the frame, and the rear plow is hung inside, and the shaft for this plow has a scale, S, of inches, to gage the width of the furrows, and the plow is adjustable on this shaft. The forward plow may also be put on a scale-shaft, if needed. The shanks E of the plows are secured in the lifters in a position slanting forward from below to give pitch to the plow. The shanks of the plows have also a scale, S, to gage the depth of the furrows. The shafts, on the side of the frame next to the line *e e,* have on each a fixed crank, *f,* both in the same line, and between which is a connecting-rod, G, and a like connecting-rod unites the rear crank with the lever H. These cranks, rods, and lever are all in one line, and the lever operates both the plows, raising them out of the ground or resetting them; or both connecting-rods may pass directly to the lever, and the two plows be operated by one lever in this way. The lever works in a slot in a section, I, of a circle on the side of the frame, and is provided with a cut-off, K, jointed to it, the lower end of which catches in notches *i* in the edge of the semicircle, to hold the plows in a given position. The flanges *d,* as I have shown, help to hold the plows in working position, to keep them from burying too deep in the ground. From the forward crank is extended, above, a rod, with an adjustable balance-weight, *m,* which assists in balancing the weight of the plows when they are raised; or this balance may be placed on the front lifter, or elsewhere, or it may be divided, and a part of it be attached to one shaft or crank, and a part to the other.

The frame is made so that the pole, and therefore the draft, shall be directly in front of, and between the plows.

I am aware of the patent of Wm. H. Isaacs and George E. Banner having features similar to some of mine; but it will be found that I do not claim any points embraced in their invention; but what I claim are matters of improvement on theirs, and, so far as I know, on all others.

I do not claim the principle, as shown in the patent of Isaacs and Banner, of raising a plow by a lever or levers and connecting-rods.

I claim—

1. The plows A, by the lifters B, hung to the revolving shafts C, and the flange-stops *d,* in combination with the frame D, substantially as and for the purposes specified.

2. The plows standing at an oblique angle in the lifters, and provided with the scale-gages S, to graduate the width and depth of cut, and hung, one on the outside and the other on the inside of the frame, substantially as set forth, and for the purposes specified.

3. The combination of the lever H, operating in the semicircle I, rods G, cranks *f f,* rock-shafts *c c,* arms B, and plows A, whereby both plows are operated by one lever, substantially as and for the purposes set forth.

4. The plows A, lifters B, shafts C, and weight M, in combination with the lever H and connecting-rods and cranks G *f,* arranged substantially as shown and described, and for the purposes set forth.

FREDC. H. ISAACS.

Witnesses:
HORACE HARRIS,
J. C. TUNBRIDGE.